United States Patent [19]

Ohmori et al.

[11] 4,079,036
[45] Mar. 14, 1978

[54] FLAME-RETARDANT FIBER

[75] Inventors: Akio Ohmori; Masashi Ando; Akitsugu Akiyama, all of Kurashiki, Japan

[73] Assignee: Kuraray Co., Ltd., Kurashiki, Japan

[21] Appl. No.: 609,835

[22] Filed: Sep. 2, 1975

Related U.S. Application Data

[63] Continuation-in-part of Ser. No. 518,058, Oct. 25, 1974, abandoned.

[51] Int. Cl.$^2$ .......................... C08K 3/24; C08L 27/06
[52] U.S. Cl. ..................... 260/45.75 D; 260/45.75 R; 260/45.75 B; 260/876 R; 260/884; 260/899; 264/185
[58] Field of Search ............ 260/884, 876 R, 45.75 D, 260/899; 264/185; 252/8.1

[56] References Cited

U.S. PATENT DOCUMENTS

| 3,676,362 | 7/1972 | Yates | 260/45.75 D X |
| 3,829,400 | 8/1974 | Kato et al. | 260/37 N |
| 3,859,390 | 1/1975 | Tsuji et al. | 260/45.75 D X |
| 3,926,883 | 12/1975 | Touval | 260/45.75 D X |
| 3,928,261 | 12/1975 | Ashidaga et al. | 260/889 |
| 3,962,398 | 6/1976 | Matsuo et al. | 264/185 X |

Primary Examiner—Murray Tillman
Assistant Examiner—Thurman K. Page
Attorney, Agent, or Firm—Bacon & Thomas

[57] ABSTRACT

Shaped articles comprised of PVA and PVC having improved flame-retardancy and resistance to discoloration resulting from heat treatment are provided by the incorporation therein of calcined stannic acid, characterized by a specific crystal size.

10 Claims, 2 Drawing Figures

FLAME-RETARDANT FIBER

This application is a continuation-in-part of application Ser. No. 518,058, filed Oct. 25, 1974, and now abandoned.

BACKGROUND OF THE INVENTION

1. Field of the Invention

The present invention relates to a fiber comprising polyvinyl alcohol (PVA) and polyvinyl chloride (PVC) which is treated with calcined stannic acid of a specific crystal size to improve flame retardancy and resistivity to discoloration resulting from heat treatment of the fibers.

2. Description of the Prior Art

Stannic acid and tin dioxide are well known flame retardants for cellulosic fibers. It is also known to add stannic acid as a flame retardant to a mixed PVA halogen-containing polymer fiber as suggested in U.S. Pat. No. 3,859,390 granted Jan. 7, 1975. The aforementioned flame retardants exhibit certain disadvantages, however, such as relatively poor fire retardancy unless more than 10% of the flame retardant is added to the fiber. Horemover, these known flame-retardants tend to cause glowing or reduction in the fiber strength.

The addition of stannic acid as a flame retardant in a mixed PVA/PVC fiber satisfactorily promotes flame-retardancy but causes considerable discoloration of the fiber during heat treatment thereof. When polyvinyl alcohol-polyvinyl chloride fiber is post-treated with tin tetrachloride to incorporate stannic acid in the fiber, discoloration resulting from such post-treatment is likewise significant. When the aforesaid fiber is manufactured by a process wherein the stannic acid is dispersed in the PVA/PVC spinning solution so as to incorporate stannic acid in the fiber, discoloration similarly results upon final heat treatment.

SUMMARY OF THE INVENTION

It is, therefore, a primary object of the present invention to provide a PVA/PVC fiber having excellent flame-retardant properties while simultaneously avoiding the problems and disadvantages associated with prior flame-retardant PVA/PVC fibers.

A further object of the invention is to provide a mixed PVA/PVC fiber which evidences excellent flame-retardancy, water-proofness, resistance to discoloration, strength and weather resistance.

Still another object is to provide a process for the incorporation of an effective amount of calcined stannic acid flame-retardant in a mixed PVA/PVC fiber.

The foregoing objects are accomplished by the fibers and methods for producing same of the present invention wherein calcined stannic acid having a specific critical crystal size is incorporated in mixed PVA/PVC fibers.

DETAILED DESCRIPTION OF THE INVENTION

Figure 1:
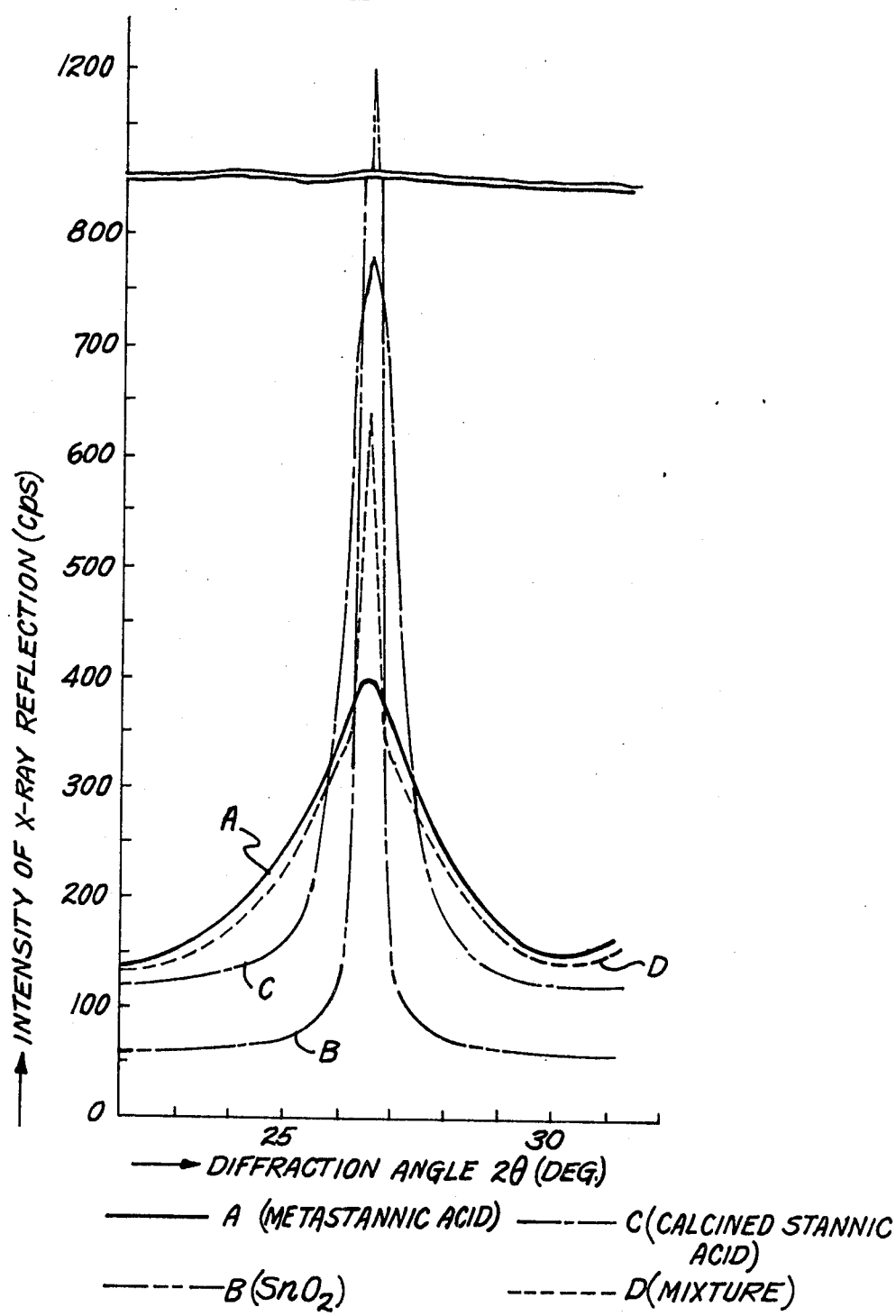

It has now been surprisingly discovered that the addition of calcined stannic acid having a specific crystal size to PVA/PVC mixed polymer fiber renders the fiber more flame-retardant than with conventional stannic acid and at the same time does not cause discoloration of the fiber in the course of heat treatment contrary to the discoloration characteristic with prior art stannic acid treated fibers.

Usually, tin dioxide and metastannic acid are represented by the chemical formulae of $SnO_2$ and $H_2SnO_3$, respectively. From X-ray diffractometer charts, however, the crystal lattice of tin dioxide ($SnO_2$) seems to be identical with that of metastannic acid ($H_2SnO_3$). Therefore, both tin dioxide and metastannic acid may properly be regarded as hydrates of $SnO_2$ represented by a chemical formula $SnO_2 \cdot xH_2O$ wherein $x$ is approximately 1 for the commercial metastannic acid and approximately zero for the commercial tin dioxide. The present inventors have directed their attention to a calcining process in which the monohydrate of $SnO_2$ or metastannic acid loses its water and is converted into its corresponding anhydride or $SnO_2$. Thus, a number of $SnO_2$ compounds were prepared by calcining metastannic acid for different intervals of time and at different temperatures, and their crystal sizes were measured using an X-ray diffraction method. Then, these $SnO_2$ compounds were added to the PVA/PVC mixed fiber and their effect on fiber flame-retardancy and resistance to discoloration on heat treatment was measured by the following method. The unexpected results observed are tabulated in the following Table 1.

Table 1.

Crystal Sizes of $SnO_2$ Compounds and The Flame-Retardant and Discoloration-Resistant Properties of the Fibers Containing Same

| No. | Compounds Starting Materials and Manufacturing Conditions | Crystal Size | Flame Resistancy (% LOI) | Discoloration Resistancy (grade) |
|---|---|---|---|---|
| 1 | tin dioxide (1) | 11000A | 31% | 4 |
| 2 | tin dioxide (2) | 1300 | 32 | 4 |
| 3 | tin dioxide (3) | 800 | 32 | 4 |
| 4 | metastannic acid (1) | 34 | 37 | 1–2 |
| 5 | metastannic acid (2) | 32 | 37 | 1–2 |
| 6 | metastannic acid (1) calcined at 250° C for 2 hours | 38 | 38.5 | 2 |
| 7 | metastannic acid (1) calcined at 400° C for 2 hours | 48 | 40.5 | 3~4 |
| 8 | metastannic acid (1) calcined at 450° C for 2 hours | 55 | 41 | 4 |
| 9 | metastannic acid (1) calcined at 500° C for 3 hours | 86 | 41 | 4 |
| 10 | metastannic acid (1) calcined at 500° C for 8 hours | 117 | 40 | 4 |
| 11 | metastannic acid (1) calcined at 550° C for 3 hours | 145 | 40 | 4 |
| 12 | metastannic acid (1) calcined at 600° C for 2 hours | 187 | 39.5 | 4 |
| 13 | metastannic acid (1) calcined at 450° C for 5 hours | 215 | 33.5 | 4 |
| 14 | metastannic acid (1) calcined at 1000° C for 20 minutes | 400A | 33 | 4 |
| 15 | metastannic acid (1) calcined at 1000° C for 3 hours | 570 | 32.5 | 4 |
| 16 | metastannic acid (2) calcined at 400° C for 2 hours | 60 | 41 | 4 |
| 17 | metastannic acid (2) calcined at 500° C for 8 hours | 280 | 33.5 | 4 |
| 18 | a uniform mixture of tin dioxide (3) and commercial metastannic acid (1) at a mixture ratio of 10:90 | 120 | 36 | 1–2 |
| 19 | a uniform mixture of tin dioxide (3) and metastannic acid (1) at a mixture ratio of 20:80 | 420 | 35 | 1–2 |

(I) Crystal Size Measured by X-ray Diffraction Method.

A Geiger Flex D-3F type device produced by Rigaku Denki K.K. and a Cuk α beam which was emitted from a source of 40 KV and 15 mA, and converted into a monochromatic beam through a Ni filter was employed. The crystal sizes were measured in such a way that a breadth at half-maximum intensity of interference profile on the (110) plane ($2\theta 26.6°$) of Cassiterite ($SnO_2$) was obtained from the chart, the value thereof was corrected using the Jones method and the corrected value was applied to Scherrer's equation.

(II) Flame-Retardancy (LOI — Limiting Oxygen Index)

As test samples, knitted cloths (weight: 250 g/m$^2$) made of filament yarn (1000 filaments, 2000 denier) spun from a spinning solution of PVA, PVC and $SnO_2$ compounds with a weight ratio PVA:PVC:$SnO_2$ equal to 67:33:2, were employed.

The limiting oxygen index (LOI), defined as the minimum oxygen concentration in percent required to maintain the combustion in a gaseous mixture of oxygen and nitrogen, was measured for each of the test samples by using a ON-1 type device produced by Toyo Rika Company Limited. A high LOI value corresponds to a high degree of flame retardant property for the test samples.

(III) Discoloration by Heat Treatment.

The PVC/PVA mixed fiber containing stannic compounds is subjected to dry heat drawing for 18 seconds at 227° C so that the fiber is drawn to three times its original length and then to dry heat setting until the fiber length decreases by 10 percent. The degree of discoloration of the fiber caused by such heat treatment was determined by visual inspection and ranked in the following five grades.

| | |
|---|---|
| Grade 5 | None |
| Grade 4 | Very little |
| Grade 3 | Slight |
| Grade 2 | Rather considerable |
| Grade 1 | Considerable |

It was surprisingly found that the PVA/PVC mixed fiber containing calcined stannic acid with a crystal size in the range of 45 to 200A exhibited obviously superior flame-retardancy compared to those of the fiber containing $SnO_2$ such as test samples Nos. 1 to 3 in the above Table are substantially inferior to that of the fibers with calcined stannic acid having a crystal size in the range of 45–200A. The crystal size of stannic acid incorporated into the fiber and obtained by post-treatment of metastannic acid or tin tetrachloride is normally smaller than about 40A to 45A. The flame-retardant property of test samples Nos. 4–5 containing metastannic acid is superior to that of the test samples containing tin dioxide, but are still less than that of the fibers according to the present invention. In addition, the fiber with incorporated metastannic acid is obviously defective in that it tends to discolor upon heat treatment. On the other hand, the fiber containing calcined stannic acid with a crystal size in the range of 45 to 200A has superior fire-retardant properties compared to that of the fiber containing metastannic acid or tin dioxide and does not discolor upon heat treatment of the fiber.

To make the difference between the two clearer, tests were conducted to ascertain that the calcined stannic acid having a crystal size in the range of 45 to 200A in accordance with the present invention is not a simple mixture of tin dioxide, an anhydride of $SnO_2$, and metastannic acid, a monohydrate of $SnO_2$.

A mixture of $SnO_2$ and metastannic acid, the crystal size of which is 45–200A within the limitation of the present invention, was examined with respect to the quantity of hydration and the pattern of X-ray diffraction thereof. The quantity of hydration which is represented by $x$ of $SnO_2 \cdot xH_2O$ is an important factor in identifying the compound per se. The quantity of hydration of the above mixture is larger than 0.8 while that of calcined stannic acid is less than 0.3.

Patterns of X-ray diffraction are shown in FIG. 1, wherein A represents metastannic acid, B represents $SnO_2$, C represents calcined stannic acid (sample No. 9) and D represents the mixture of sample 18. Pattern D appears to combine a broad peak of metastannic acid with a sharp peak of $SnO_2$ (there is a refraction point in the middle of the peak), while pattern C is of a very smooth curve. It is easy to distinguish patterns A, B and C respectively by reviewing the broadness and intensity of X-ray reflection of the curves.

In addition, flame-retardancy and discoloration of the fibers containing the mixture and calcined stannic acid were tabulated in Table 1, and it is clear therefrom that calcined stannic acid significantly enhanced fiber properties compared to other compounds.

It is apparent, accordingly, that calcined stannic acid having a crystal size of 45–200A is substantially different from the mixture of $SnO_2$ and metastannic acid.

The crystal size of the calcined product normally increases with increased duration and temperature of calcination, but the relation may be reversed as in the case of the test samples Nos. 10 and 13 or changed with the samples supplied by different manufactures and with different lots. It is accordingly apparent from Table 1 that the crystal size of the calcined stannic acid is the main factor in obtaining the improved properties of the mixed fiber according to the instant invention.

The mixed fiber of the present invention is comprised of PVA and PVC and, preferably, the weight ratio of PVA and PVC is 90:10 to 50:50. The amount of calcined stannic acid incorporated in the fiber is 0.1 to 10% based on the total weight of the polymers.

The term "PVC" as used herein means homopolymers of polyvinyl chloride, copolymers of vinyl chloride with vinylidene chloride, vinyl acetate, acrylamide, N-methylolacrylamide, acrylonitrile or ethylene wherein the content of vinyl chloride is higher than 80 mol/percent, and PVA/PVC graft copolymers. The term "PVA" means polyvinyl alcohol homopolymers, copolymers of vinyl alcohol with vinyl acetate and ethylene wherein the vinyl alcohol content is higher than 80 mol/percent, and polyvinyl alcohol derivatives obtained by acetalization (formalization, benzalization or crosslinking by periodic acid), esterification or etherification of polyvinyl alcohol. If the PVC content in the PVA/PVC mixed fiber is lower than about 10 wt. percent, the effect of the flame-retardant may be lower. On the other hand, PVC content considerably in excess of 50 wt. percent is not desirable because the fiber tends to discolor upon heat treatment. Thus the weight ratio of PVA and PVC is preferably in the range of 90:10 to 50:50. The crystal size of the calcined stannic acid should be in the range of 45 to 200A in order to render the fiber flame-retardant and resistive to discoloration due to heat treatment. If the content of calcined stannic acid is less than about 0.1 wt. percent the degree of flame-retardancy is lowered. On the other hand, a content of calcined stannic acid higher than 10 percent is also not preferred due to economic considerations and reduced processability of the fiber mixture. Thus, the preferred content of calcined stannic acid is approximately 0.1 to 10 wt. percent based on the total weight of polymers.

The calcined stannic acid of the invention with a crystal size in the range of 45 to 200A is derived from commercial metastannic acid, or $\alpha$-stannic acid or $\beta$-stannic acid which are obtained by neutralization of tin compounds, such as tin tetrachloride and sodium stannate, by calcining same for 0.2 to 10 hours at a temperature of 300° to 800° C. The calcined product thus obtained is pulverized to a particle size less than 10 $\mu$ and dispersed in a mixed spinning solution of PVA and PVC emulsion which is then subjected in a known manner to spinning the resulting spinning solution into aqueous dehydrating salt solution or aqueous alkaline solution (caustic alkali solution or alkaline salt solution), roller drawing, neutralization (in case of spinning into aqueous alkaline solution), wet heat treatment, if desired water washing, salt solution application (in case of spinning into aqueous alkaline solution), drying, dry heat drawing, heat treatment and, if desired acetalizing operations to yield the flame-retardant fiber of the invention. Alternatively, the calcined product is pulverized to an average particle size of less than 10$\mu$ and dispersed into a mixed spinning solution consisting of PVA, boric acid and emulsified PVC. The resulting spinning solution is extruded into an alkaline dehydrating salt solution [either (a) aqueous solution of alkali and dehydrating salt, or (b) aqueous solution of alkaline dehydrating salt] to obtain a filament yarn. The spun filament yarn is then subjected to the steps of roller drawing, neutralization, wet heat treatment, water washing, salt solution application, drying, dry heat drawing and heat treatment to provide a PVA/PVC mixed fiber which evidences excellent water-proofness, flame-retardancy, resistivity to discoloration, strength and weathering resistance. The latter method is advantageous in that the acetalizing step for water-proofing the fiber can be omitted.

The reason calcined stannic acid with a specific crystal size of 45 to 200A shows a superior effect with respect to making the PVA/PVC mixed fiber flame-resistant is not known precisely. However, since a catalyst having a specific structure shows particular activity in many catalytic reactions, the flame-retarding agent may analogously be presumed to act as a kind of catalyst for the thermal cracking of the polymeric fiber.

It is further not clear why the PVA/PVC mixed fiber containing metastannic acid tends to discolor upon heat treatment while the same fiber containing calcined stannic acid does not display such a tendency.

In addition to the advantageous effect of calcined stannic acid of crystal size of 45 to 200A in rendering PVA/PVC mixed fiber more flame-retardant and resistive to discoloration, calcined stannic acid can be dispersed more readily than metastannic acid in the spinning solution and shows better bleachability than tin dioxide.

The present PVA/PVC fiber admixed with calcined stannic acid may be distinguished from the fiber containing the same amount of metastannic acid or tin dioxide. When the test samples Nos. 3, 4 and 9 in Table 1 were subjected to X-ray analysis under the same operating conditions, the No. 3 test sample containing tin dioxide showed a sharp peak of diffraction for $2\theta = 26.6°$, while the No. 9 test sample of the present invention showed a broader peak of diffraction for the same diffraction angle. On the other hand, no peak could be observed for $2\theta = 26.6°$ in the case of the No. 4 test sample containing metastannic acid. Thus, the present fiber can be easily distinguished from conventional fibers having tin dioxide or metastannic acid incorporated therein by X-ray diffraction analysis.

Figure 2:
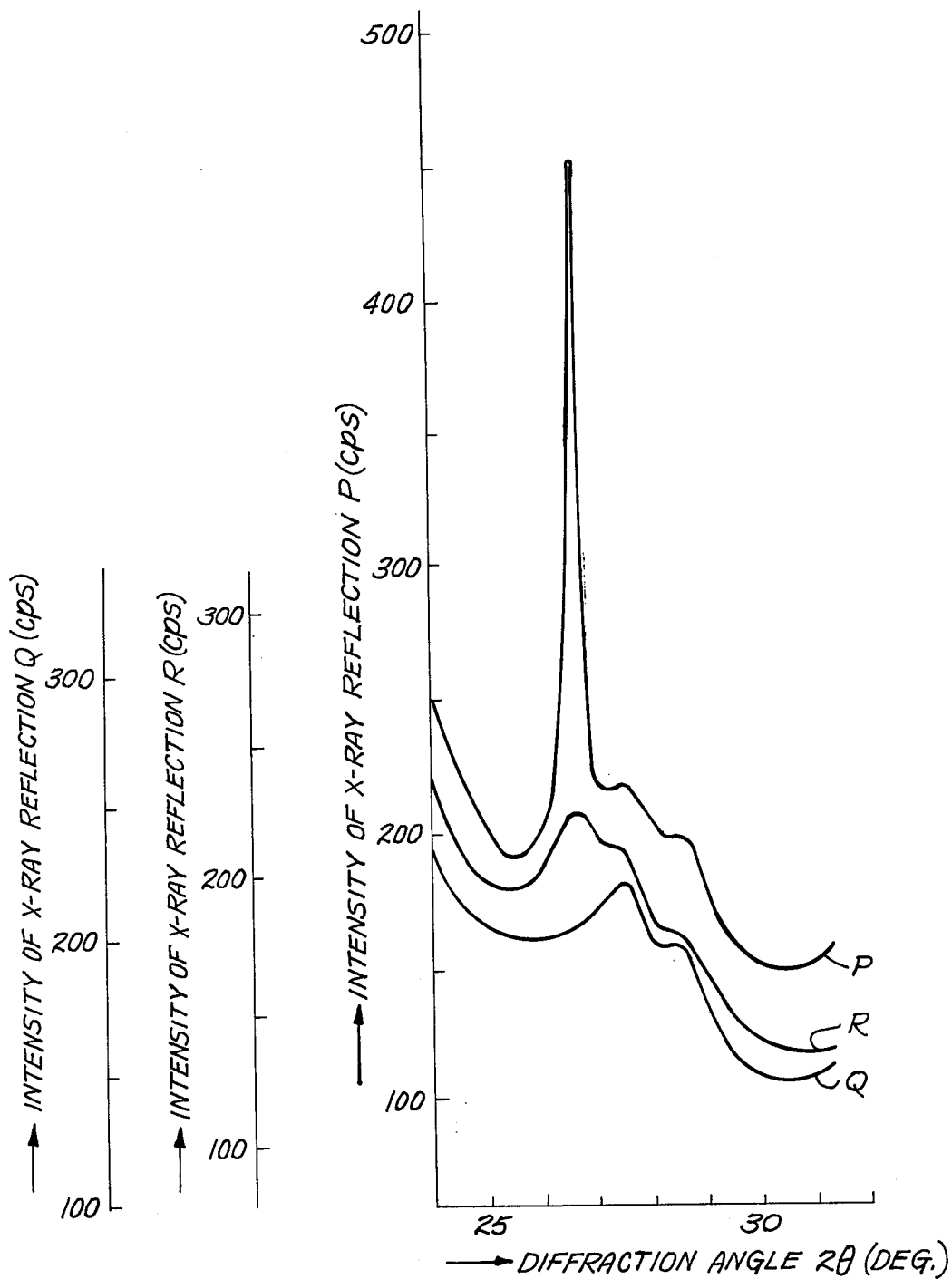

The foregoing distinctions are likewise apparent from FIG. 2 wherein pattern P, Q and R represent PVA/PVC fibers containing $SnO_2$ (sample No. 3), metastannic acid (sample No. 4) and calcined stannic acid (sample No. 9) respectively.

According to the above description, calcined stannic acid is applied to PVA/PVC fiber, but it can also be applied to other shaped products such as films and moldings. Furthermore, the present invention may be utilized with fibers consisting of halogen compounds, such as polyvinylidene chloride, chrorinated polyethylene or bromine-containing compounds and polymers.

Also, as set forth above, the fire-retardant agent comprises calcined stannic acid, but the latter may be used conjointly with other fire-retardants, such as tin dioxide, metastannic acid, antimony trioxide, zirconium oxide and others.

The present invention will be further explained by the following non-limiting examples.

EXAMPLE 1

Metastannic acid (manufactured by Showa Kako Co., LTd) was calcined for 3 hours at 500° C to obtain a calcined product with a crystal size of 70A. The resulting calcined product was added to an aqueous solution of PVA with a polymerization degree of 1700 and a saponification degree of 99.9%. The compound was incorporated in the PVA by heating the mixture. The mixture was then cooled to 70° C and added to a PVA-grafted PVC emulsion with a mean particle size of 250A obtained by emulsion polymerization, so as to obtain a spinning solution with a weight ratio of PVA:PVC:calcined stannic acid equal to 60:40:1.5 and a total polymer concentration of 18%. The spinning solution thus obtained was defoamed and extruded into a coagulating bath containing 420 g/l of Glauber's salt and 0.03 g/l of sulfuric acid. The resulting fiber was subjected to roller drawing, wet heat drawing, water washing, drying, dry heat drawing and shrinking so as to produce a fiber consisting of 1,000 (2-denier) filaments with an LOI of 43 percent. The same fiber which was subsequently formalized so that the formalization degree was equal to 33 mol. percent based on PVA, had good flame-retardancy equal to 35 percent (LOI), which was somewhat lower than that of the same fiber prior to formalization.

EXAMPLE 2

Metastannic acid was calcined for 8 hours at 500° C to obtain a calcined product with a crystal size of 120A. The calcined product was pulverized to a mean particle diameter of 2$\mu$ and dispersed in water. To this aqueous dispersion were added antimony trioxide (manufactured by Nippon Seiko Sha) and PVA with a polymerization degree of 2400 and a saponification degree of 98.6 mol. percent, and the compounds were dissolved by heating and cooled. To this mixture was added PVC emulsion with a particle size of 600A to give a spinning solution with a weight ratio of PVA:PVC: calcined stannic acid:antimony trioxide equal to 67:33:4:2 and a total polymer concentration of 15 percent. This solution was defoamed and extruded into a coagulating bath containing 300 g/l of sodium carbonate to produce a fiber comprised of 2000 (1-denier) filaments through the consecutive steps of roller drawing, neutralization, washing with water, application of salt solution, wet heat drawing, drying, dry heat drawing and shrinking. The fire-retardancy of the obtained fiber was excellent with an LOI of 45 percent and the resistivity to discoloration thereof during heat treatment was also superior with a grade 4 rating.

EXAMPLE 3

Metastannic acid (manufactured by Shin Nippon Kinzoku Kagaku K.K.) was calcined for 1.5 hours at 450° C to obtain a calcined product having a crystal size of 55A. The calcined product was then pulverized to a mean particle diameter of 1μ dispersed into water. To this aqueous dispersion were added boric acid and PVA with a polymerization degree of 1700 and a saponification degree of 99.4 mol. percent, and the compounds were dissolved by heating and then cooled to 65° C. To this mixture was added a PVC emulsion with a pH of 7 and a mean particle size of 350A, obtained by emulsion polymerization using sodium laurylsulfate as an emulsifying agent. The resulting spinning solution with a weight ratio of PVA:PVC:$H_3BO_3$:calcined stannic acid equal to 67:33:1.2:2 and a total polymer concentration of 17 percent was defoamed and extruded into a coagulating bath containing 50 g/l of caustic soda and 250 g/l of Glauber's salt to obtain a fiber consisting of 1000 (2-denier) filaments through the consecutive steps of roller drawing, neutralization, wet heat drawing, water washing, drying, dry heat drawing and shrinking. The fire-retardancy and resistance to discoloration of the resultant fiber was measured in the same way as in Table 1 and were found to be excellent (LOI-39% and grade 4, respectively). The fiber also had a strength of 6.5 g/dr. and a water-proofness which was completely acceptable even without acetalization.

EXAMPLE 4

Metastannic acid was calcined for 15 minutes at 700° C to obtain a calcined product having a crystal size of 65A. The calcined product was then pulverized to a mean particle diameter of 1μ and dispersed into water. To this aqueous dispersion was added borax and PVA with a polymerization degree of 1750 and a saponification degree of 98.8 mol. percent, and the compounds were dissolved by heating and then cooled to 70° C. To this mixture was added a PVA-grafted PVC emulsion with a mean particle size of 300A, obtained by emulsion polymerization in the presence of PVA. The resulting spinning solution having a weight ratio of PVA:PVC:borax:calcined stannic acid equal to 78:22:2:3 and a total polymer concentration of 16.5% was spun into a coagulating bath containing 150 g/l of caustic soda and 200 g/l of Glauber's salt to obtain a fiber consisting of 400 (5-denier) filaments, through the consecutive steps of roller drawing, neutralization, wet heat treatment, water washing, application of Glauber's salt, drying, dry heat drawing and shrinking. The fire-retardancy of the fiber was excellent and measured 34% in terms of LOI, the resistance to discoloration was also excellent and ranked in grade 3.

EXAMPLE 5

A spinning solution having a weight ratio PVA:PVC:$H_3BO_3$:calcined stannic acid equal to 58:42:1.2:3 and a total polymer concentration of 20.5% was prepared by using the same calcined stannic acid as used in Example 3 and under substantially the same operating conditions as in Example 3. The spinning solution was melt spun and heat treated in the same manner as in Example 3. The fiber thus obtained was subjected to acetalization with formalin so that the formalization value amounted to 20 mol. percent based on PVA, and a fiber consisting of 1000 (2-denier) filaments was obtained. The fire retardancy of the fiber was excellent and measured 40 percent in terms of LOI and it showed an excellent resistivity to discoloration.

While the invention has been described and illustrated with reference to certain preferred embodiments thereof, those skilled in the art will appreciate that various changes and substitutions therein can be made without departing from the spirit of the invention. It is intended, therefore, that the invention be limited only by the scope of the claims which follow.

What is claimed is:

1. Shaped articles having improved flame-retardant properties and resistance to discoloration when subjected to heat treatment comprising a mixture of
    (1) a polymer having a vinyl alcohol content higher than 80 mol percent or a polyvinyl alcohol derivative obtained by acetalization, esterification or etherification of polyvinyl alcohol;
    (2) A polymer having a vinyl chloride content higher than 80 mol percent, and
    (3) a flame-retardant amount of calcined stannic acid having a crystal size in the range of 45–200A.

2. Shaped articles as defined by claim 1, wherein said articles are in the form of fibers.

3. Shaped articles as defined by claim 2, wherein the weight ratio of polyvinyl alcohol to polyvinyl chloride ranges between 90:10 and 50:50 and the amount of calcined stannic acid incorporated therein is between about 0.1 to 10% based upon the total weight of the polymers.

4. Shaped articles as defined by claim 1, wherein said calcined stannic acid has a mean particle size of less than 10μ.

5. Shaped articles as defined by claim 1, wherein said calcined stannic acid is obtained from metastannic acid or the neutralization of a tin compound selected from the group consisting of tin tetrachloride and sodium stannate and calcination of the product thereof for between about 0.2 to 10 hours at a temperature between about 300° C to 800° C.

6. Shaped articles as defined by claim 1 wherein component (1) is a vinyl alcohol homopolymer or copolymer of vinyl alcohol and a copolymerizable monomer.

7. Shaped articles as defined by claim 1 wherein component (2) is a vinyl chloride homopolymer or copolymer of vinyl chloride and a copolymerizable monomer.

8. Shaped articles as defined by claim 1 wherein component (2) is a graft copolymer of polyvinyl alcohol and polyvinyl chloride.

9. Shaped articles as defined by claim 1 wherein component (1) is a vinyl alcohol homopolymer or copolymer of vinyl alcohol and a copolymerizable monomer and component (2) is a vinyl chloride homopolymer or copolymer of vinyl chloride and a copolymerizable monomer.

10. The fiber as defined by claim 3, wherein said fiber has a limiting oxygen index between 38.5% and 45%.